O. D. RICE.
METHOD OF AND APPARATUS FOR DRYING MATERIAL.
APPLICATION FILED JAN. 15, 1919.
1,328,897.
Patented Jan. 27, 1920.
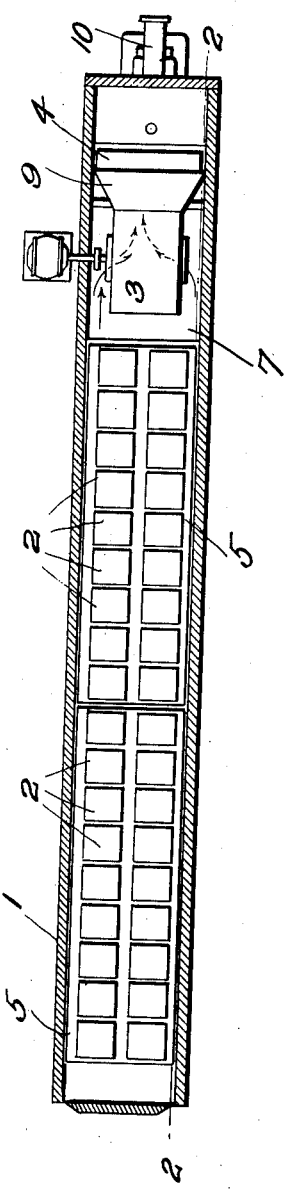
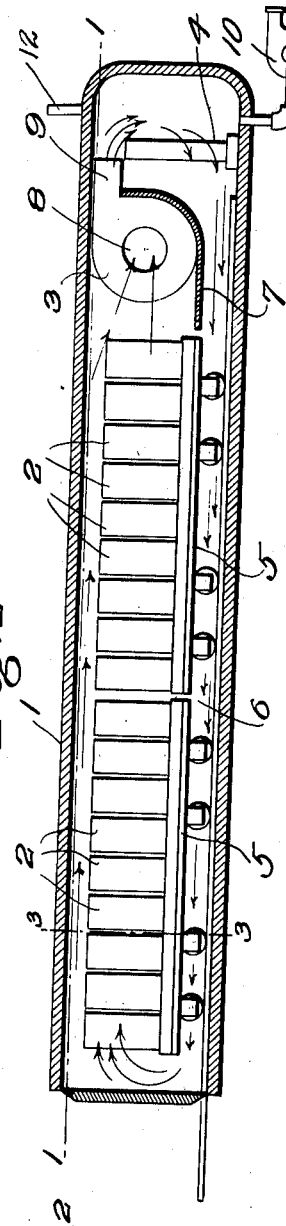
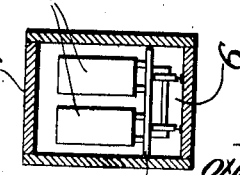
Inventor
Otis D. Rice,
by Heard Smith & Tennant
Atty's.

UNITED STATES PATENT OFFICE.

OTIS D. RICE, OF WINTHROP, MASSACHUSETTS.

METHOD OF AND APPARATUS FOR DRYING MATERIAL.

1,328,897. Specification of Letters Patent. Patented Jan. 27, 1920.

Application filed January 15, 1919. Serial No. 271,288.

*To all whom it may concern:*

Be it known that I, OTIS D. RICE, a citizen of the United States, residing at Winthrop, county of Suffolk, State of Massachusetts, have invented an Improvement in Methods of and Apparatus for Drying Material, of which the following description, in connection with the accompanying drawing, is a specification, like characters on the drawing representing like parts.

This invention relates to an improved apparatus for and a method of drying material by which the material can be rapidly dried at a relatively low temperature and with increased economy in the expenditure of power, heat units and time.

In carrying out my method, I employ an apparatus which includes a relatively large drying chamber in which the material to be dried is placed, a circulating passage having one end connected to one end of the chamber and the other end connected to the other end of the chamber, said chamber and circulating passage constituting an air-tight closed circuit, means, such as a fan, to circulate the heating medium through said closed circuit, means to supply heat to said drying medium during its circulation, and means to maintain a reduced pressure in the drying chamber.

When the apparatus is in use, the fan operates to circulate the heating medium through the closed circuit continuously in the same direction, said medium passing over the heating means and taking up heat therefrom and then passing over the material to be dried and delivering heat thereto. The heating of the material will cause an evaporation of the moisture therein, the vapor thus delivered from the material commingling with and forming part of the heating medium. The means for maintaining a reduced pressure is preferably in the form of a suction apparatus which is connected to the closed circuit at a point between the fan and the heat-supplying means, said suction apparatus operating to withdraw from the closed circuit moisture in the form of a vapor as fast as it is evaporated from the material being dried and also operating to maintain the desired reduced pressure in the drying chamber. After the apparatus has been in operation for a time the heating medium will thus be largely or entirely aqueous vapor evaporated from the material being dried, such vapor becoming superheated by passing over the heating means so that the heating medium which is carried over the material to be dried is dry or superheated steam at a relatively low pressure. An advantage gained by using superheated steam as the heating medium is that there is no danger of burning the material to be dried as might be the case if air at high temperature were used as the heating medium.

In order to give an understanding of my invention, I have illustrated in the drawings more or less diagrammatically an apparatus embodying the invention and by which the method may be carried out.

Figure 1 is a horizontal sectional view through an apparatus embodying my invention taken on substantially the line 1—1, Fig. 2;

Fig. 2 is a vertical section taken on substantially the line 2—2, Fig. 1;

Fig. 3 is a section on the line 3—3, Fig. 2.

In the drawings 1 indicates a closed air-tight chamber in which the material 2 to be dried may be placed; 3 indicates a fan or blower by which the heating medium is caused to circulate over the material 2, and 4 is a suitable heater situated so that the heating medium is caused to pass thereover during its circulation thereby to absorb heat therefrom.

The space in which the material 2 is received forms part of a closed circulating passage arranged so that the fan or blower 3 will produce a circulation of the heating medium through this closed circulating passage.

Various constructions may be employed to provide the desired closed circuit for the heating medium, and one simple construction is illustrated herein wherein the material 2 to be dried is supported on platform cars 5 which are contained within the chamber 1 and the platform of which is of a width to extend clear across the chamber, as seen plainly in Fig. 3, so that the platforms of these cars constitute a horizontal partition dividing the interior of the chamber 1 into two passages which are connected at the ends of the chamber, the upper one of which contains the material 2 to be dried, and the under one of which is indicated at 6. The fan 3 will preferably be placed at one end of the chamber 1, and a suitable partition 7 will be employed which extends across the chamber adjacent to the fan and forms a continuation of the dividing partition.

The inlet 8 of the fan communicates with the upper passage of the chamber in which the material 2 is placed, and the discharge 9 of the fan delivers into the lower passage 6 just in advance of the heater 4. As a result, the fan will operate to force a current over the heater 4 and through the lower passage 6 and to draw the air through the upper passage over the material 2. Thus a closed circuit is formed through which a current is continuously maintained. A suitable suction or exhaust apparatus is connected to the chamber between the delivery end of the fan 9 and the heater 4. This suction or exhaust apparatus is indicated generally at 10 and is connected to the chamber by the pipe 11.

One method of operating the apparatus is to place the material 2 to be dried in the chamber, and after the latter is closed airtight to start the circulating device 3 and suction apparatus 10 in operation. When the device first starts up the medium which is circulated will be largely air, and this air will first be heated by passing over the heater 4 and then will traverse the passage 6, pass over the material 2 to be dried, and be returned to the fan or blower 3 which will again cause it to make the circuit. In passing over the material 3, the air gives up heat and heats the material, and as soon as the material 2 is heated sufficiently to cause the moisture therein to evaporate, then steam or aqueous vapor will pass off from the material 2 and be commingled with the air. The generation of steam or vapor will tend to increase the pressure in the closed chamber, but this tendency is counteracted by the operation of the exhaust or suction apparatus 10 which withdraws some of the circulating medium from the chamber.

As the device continues in operation and as the temperature of the material 2 increases a greater quantity of steam or vapor will be generated and hence a greater proportion of the circulating medium will be in the form of steam or vapor. This circulating medium is wettest at the point where it is the coolest which is the point just before it passes over the heater 4 and at which the suction apparatus is connected. Hence the suction apparatus operates to withdraw from the chamber 1 a portion of the circulating medium containing the most moisture. After the device has been in operation a short time, the circulating medium will be largely in the nature of dry or superheated steam, but since the prime factor in drying the material 2 is to heat it to the point where the moisture therein will evaporate, the use of dry or superheated steam as the drying medium is as effective as any other drying medium.

The suction apparatus will preferably be operated so as to maintain a reduced pressure in the chamber which is an advantage because thereby the temperature at which evaporation takes place is reduced. Inasmuch, however, as the attenuation of the heating medium by reducing the pressure results in decreasing the efficiency of the fan and the heater, there is a limit to which the pressure can be reduced without impairing the heating efficiency of the apparatus.

If inflammable materials are being dried, it will be an advantage to first operate the suction apparatus 10 to withdraw part or all of the air from the drying chamber before the material is heated to any considerable extent. The producing of vacuum conditions in the chamber will cause an evaporation of moisture from the material to be dried, and when the fan is started up this moisture will be circulated and will constitute the heating medium for further heating the material to be dried. By this method there will be no danger of burning the inflammable material or causing any explosion because of the absence of air in the circulating medium.

An advantage which arises from the arrangement shown wherein the circulating medium is heated before it passes through the passage 6 is that if the platforms 5 of the cars are of metal, the passage of the heated circulating medium 6 beneath said platforms will heat the latter so that they will act to transmit the heat to the portion of the material 2 lying next to the platform. The heating medium will naturally move more freely over the upper part of the material 2, but by this arrangement the lower part of the material receives added heat from the car platforms 5 and thus the material will be uniformly heated from top to bottom.

An important feature of the present invention is the maintaining of a closed circulation of the drying or heating medium in a relatively large vacuum chamber and the provision of a suction apparatus for maintaining the desired reduced pressure in said chamber. By the use of the closed circuit there will be no heat units wasted except those which are contained in the vapor which is drawn off by the suction apparatus and by radiation, and hence the device can be operated with great economy.

In using the device the suction apparatus 10 will be operated only as necessary to maintain the desired reduced pressure, and as the pressure will increase only as the moisture is evaporated, the suction apparatus in reality operates simply to keep down the pressure and temperature by withdrawing from the chamber 1 the moisture as fast as it evaporates. By using a suitable vacuum gage, as indicated at 12, the pressure in the chamber 1 can always be observed. When the material is entirely dry, then there will be no tendency for the pressure in the chamber to increase, and hence the reading of the vacuum gage will give indication as to when the material is properly dried.

While I have herein illustrated a construction wherein the closed circuit is formed in a vacuum chamber by the platforms 5 of the cars on which the material is dried, yet any other construction might be employed which would provide a closed circuit for the circulating medium without departing from the invention.

I claim:

1. In a vacuum drying apparatus, the combination with a vacuum chamber to contain the material to be dried, of a fan situated within said chamber, means providing a closed circuit whereby the fan will operate to circulate a drying and heating medium continuously through said closed circuit and over the material to be dried, means to deliver heat to said circulating medium, and a suction apparatus connected to said chamber for removing part or all of the vapor caused by the evaporation of moisture in said material.

2. In a vacuum drying apparatus, the combination with a vacuum chamber to contain the material to be dried, of a fan situated within said chamber, means providing a closed circuit whereby the fan will operate to circulate a drying and heating medium continuously through said closed circuit and over the material to be dried, means to deliver heat to said circulating medium, and a suction apparatus connected to said chamber at a point traversed by the circulating medium immediately before the heat is delivered thereto for the purpose of withdrawing from said chamber the vapor caused by the evaporation of moisture in said material.

3. In a vacuum drying apparatus, the combination with a vacuum tight compartment to contain the material to be dried, of means to cause the same current of drying or heating medium to pass repeatedly through said compartment in one direction and over the material to be dried, and means to maintain a reduced pressure in said compartment and to withdraw from the compartment the vapor caused by the evaporation of moisture in said material.

4. The process of drying material which consists in causing a relatively large volume of heating or drying medium to be passed continuously and repeatedly through a closed circuit containing the material to be dried, heating said medium as it passes through one portion of said circuit, and maintaining said medium throughout its circuit at a pressure less than atmospheric pressure by withdrawing continuously from the circuit a portion of said medium.

5. In a vacuum drying apparatus, the combination with a casing having therewithin a closed circuit through which a drying or heating medium circulates, one portion of said circuit constituting a chamber to contain the material to be dried, of means situated within said casing to continuously circulate said medium through said closed circuit and over the material to be dried, means also within said casing to deliver heat to the circulating medium, and means to maintain a reduced pressure throughout said closed circuit by withdrawing from the circuit continuously a portion of said medium.

In testimony whereof, I have signed my name to this specification.

OTIS D. RICE.